3,489,558
PHOTOCONDUCTIVE BENZOBISTHIAZOLES AND THEIR USE IN ELECTROPHOTOGRAPHIC PROCESSES
Nicholas J. Clecak, San Jose, Robert J. Cox, Los Gatos, Samuel L. Solar, San Jose, and Herbert K. Wurster, Los Gatos, Calif., assignors to International Business Machines Corporation, Armonk, N.Y., a corporation of New York
No Drawing. Filed Sept. 18, 1967, Ser. No. 668,703
Int. Cl. G03g 5/06, 13/22; C07d 91/46
U.S. Cl. 96—1
13 Claims

ABSTRACT OF THE DISCLOSURE

The organic photoconductors are of the class of amino-, alkyl-, and azo-m-benzobithiazoles and include both linear and angular compounds. The amino-, alkyl-, and azo-substituents contain aryl, arylalkenyl, substituted aryl or substituted arylalkenyl groups. These compounds are useful as photoconductors in electrophotographic processes.

BACKGROUND OF THE INVENTION

Field of the invention

This invention relates to a class of organic photoconductive materials and, more particularly, relates to their preparation and their use as photoconductors in electrophotographic processes, especially those utilizing contact reflex exposure.

Description of prior art

A number of organic photoconductors are known in the prior art, but most of them have not achieved commercial success because their sensitivity or exposure speed is too slow to compete favorably with the commercially used inorganic photoconductors, such as selenium. However, aside from speed, most organic photoconductors offer many advantages over the commercially used selenium. That is, photoconductive elements fabricated from organic photoconductors are easily manufactured, can be substantially translucent, and are sufficiently flexible to be used in belt configurations and the configurations of U.S. patent application Ser. No. 649,162 filed June 22, 1967.

SUMMARY OF THE INVENTION

It has been found that a class of bisthiazoles offer the above advantages and, in addition, exhibit dichroism. These bisthiazoles have a structural formula selected from the group consisting of:

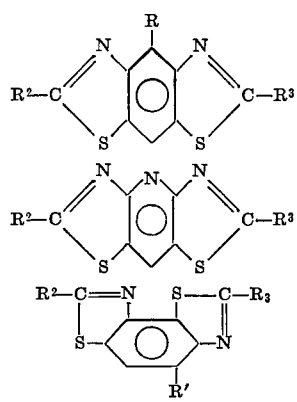

wherein R is selected from the group consisting of hydrogen, lower alkyl, lower alkoxy, and halogen, wherein $R^1$ is selected from the group consisting of lower alkyl, lower alkoxy, and halogen, and wherein $R^2$ and $R^3$ may be the same or different and are selected from the group consisting of azo, imino, and alkenyl radicals with substituents selected from the group consisting of aryl, arylalkenyl, substituted aryl, and substituted arylalkenyl. Preferably, aryl of the above substituents is phenyl. More specifically, $R^2$ and $R^3$ have a structural formula selected from the group consisting of:

I
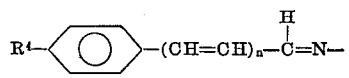

II
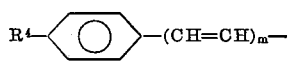

III

wherein $R^4$ is selected from the group consisting of hydrogen, lower dialkylamino, nitro, lower alkoxy, morpholino, thiomorpholino, piperidino, halo, and julolidinyl, wherein $n$ is an integer from 0 to 3, inclusive, and wherein $m$ is an integer from 1 to 4, inclusive, This class of compounds is a novel class when the lower dialkylamino of $R^4$ of Formula I is only defined as dimethylamino when $n$ is 0.

In addition, the present invention includes the novel intermediate compound having the following structural formula:

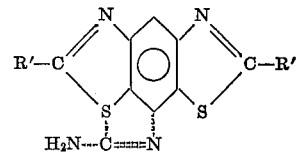

wherein R is selected from the group consisting of halo, lower alkyl, and lower alkoxy, and R' is selected from the group consisting of amino and methyl.

In general, most of the compounds are prepared by first preparing the bisthiazole with either diamino or dimethyl substituents in the 2,6 positions. For example, 2,6-diaminobenzo[1,2-d:5,4-d']bisthiazole is prepared according to G. Barnikow, H. Kunzek, and M. Hofmann, J. Pract. Chem., [4] 27, 271(1965). Substituted compounds, it has been found, can also be prepared by this general method with the substituent being in the 2 position on the m-phenylenediamine in the preparation of a linear compound and the 4 position on the m-phenylenediamine for the preparation of an angular compound. For example, substituted angular compounds were prepared by starting with m-phenylenediamine dihydrochloride substituted in the 4 position with either a lower alkyl, such as methyl, lower alkoxy, such as methoxy, or a halogen, such as chloro, depending upon which substituted compound is desired. The particular 4-substituted-m-phenylenediamine dihydrochloride is heated for about 4 hours with a slight excess of ammonium thiocyanate in water on a steam bath. The reaction mixture is made basic with, for example, sodium hydroxide, filtered, and reprecipitated by the addition of hydrochloric acid. The precipitate, which is a bisthiourea is filtered, water washed, and dried. Next, the bisthiourea is slurred in chloroform, to which is added dropwise a bromine solution at a concentration of 2 moles per mole of the bisthiourea at room temperature. The slurry is stirred for about 4 hours followed by heating to reflux for about 16 hours. The precipitate is filtered, neutralized with a base, such as ammonium hydroxide, and recrystallized out of ethanol water to yield 2,7-diaminobenzo[1,2-d:3,4-d']bisthiazole substituted in 4-position with one of the above-mentioned substituents.

Substituted linear bisthiazoles are prepared in a similar manner except that the starting m-phenylenediamine dihydrochloride is substituted in the 2-position.

The 2,6 - dimethylbenzo[1,2 - d:5,4-d']bisthiazole is prepared by the general procedure of Gazz. Chem. Ital., 89, 254 [1959]. It has been found that 2,6-dimethylbenzo [1,2-d:5,4-d'] and 2,7-dimethylbenzo[1,2-d:3,4-d']bisthiazole, substituted in the 4-position can be prepared by the same general procedure with the proper starting material.

The next step in the process of preparing compounds of the above general class involves a condensation reaction between an appropriate aldehyde and either the diamino or dimethyl substituents of the bisthiazoles. This condensation step is carried by refluxing with a slight excess of the aldehyde in an alcohol, such as butanol or ethylene glycol.

The 2,6-diazobenzo[1,2-d:5,4-d'] bisthiazol unsubstituted and substituted in the 4-position and the 2,7-diazobenzo [1,2-d:3,4-d'] bisthiazol, substituted in the 4-position, are prepared by treating the corresponding diaminobenzobisthiazole with nitrous acid to convert the diamino substituents to diazo substituents. To prepare compounds within the above general class from the diazobenzobisthiazoles, the diazo substituents are reacted with N-dialkylaniline.

Examples of compounds prepared by the above general processes and within the present invention have the following formulae:

FORMULA 1

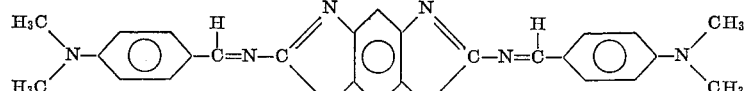

FORMULA 2

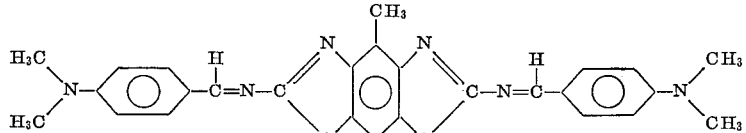

FORMULA 3

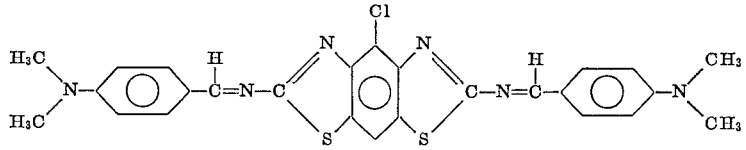

FORMULA 4

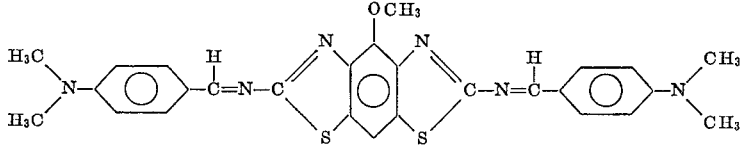

FORMULA 5

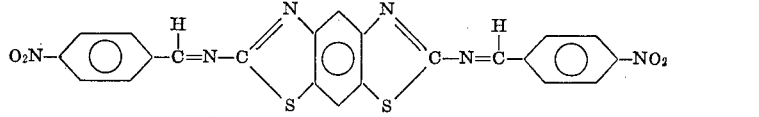

FORMULA 6

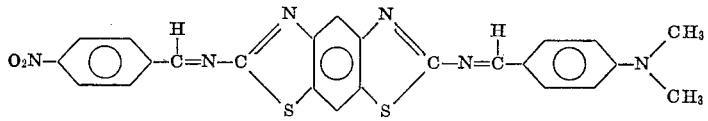

FORMULA 7

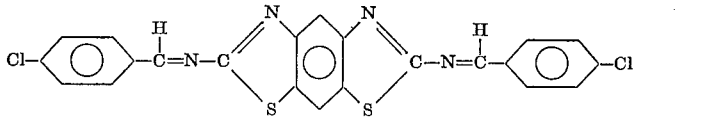

FORMULA 8

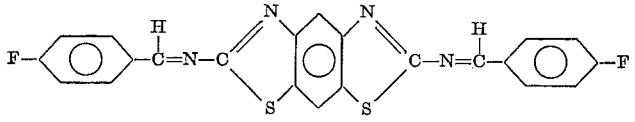

FORMULA 9

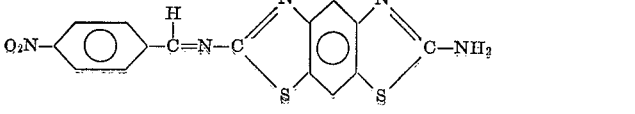

FORMULA 10
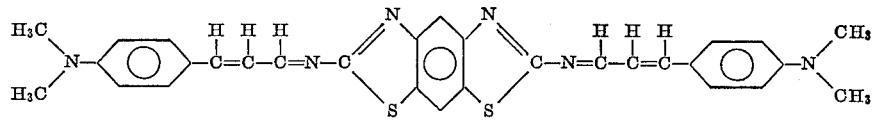
FORMULA 11
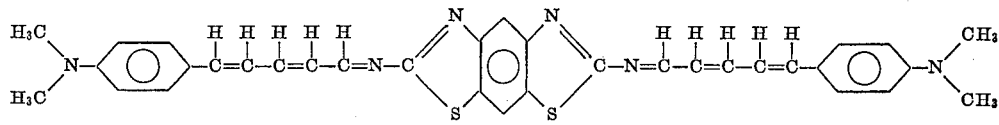
FORMULA 12
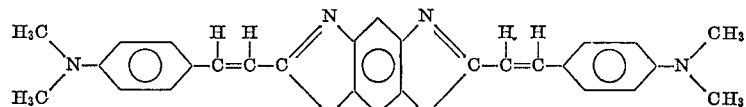
FORMULA 13
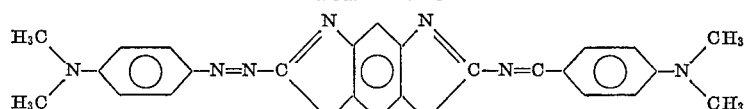
FORMULA 14
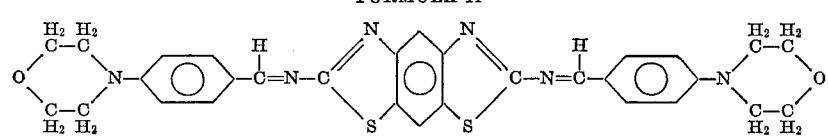
FORMULA 15
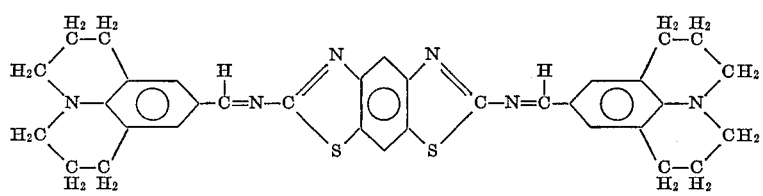
FORMULA 16
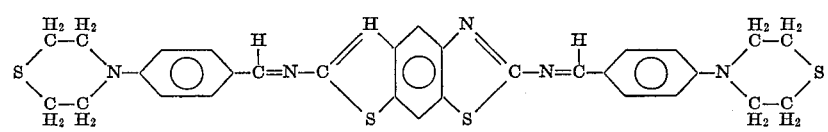
FORMULA 17
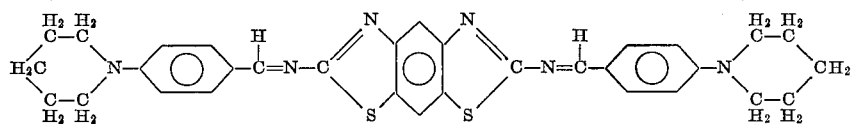
FORMULA 18
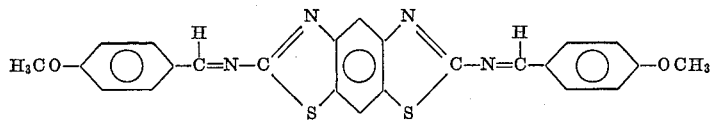
FORMULA 19
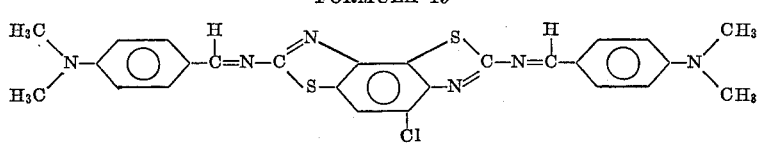
FORMULA 20
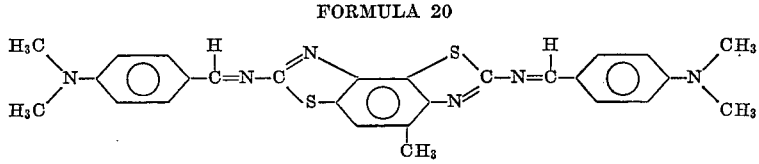

FORMULA 21

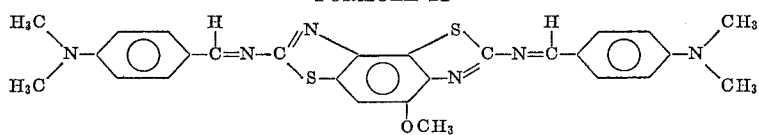

FORMULA 22

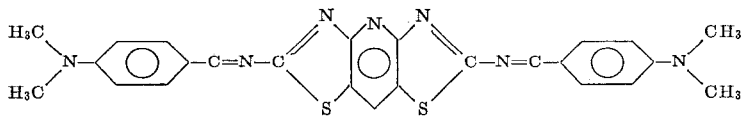

For the preparation of photoconductive elements, it is advantageous for the compounds of the general formula to be in solution of organic solvents, such as tetrahydrofuran, or any other solvent in which the compounds are at least partially soluble. Such solutions are applied to substrates suitable for electrophotography and the solvent is then removed. Mixtures of solvents can also be used.

Instead of the above preparation, the compounds of the general formula can be used in conjunction with a resinous binder. Suitable resins include both natural and synthetic resins, examples of which are balsam resins, phenol resins modified with colophony, coumarone resins, indene resins, cellulose ethers, polyvinylchlorides, polyvinylacetate, acrylic polymers, such as polymethylacrylic esters, polystyrene, polyisobutylene, polyvinylformal, polycondensates, such as phthalate resins, alkyd resins, maleic acid resins, phenolformaldehyde resins, polyamides, and polyadducts, such as polyurethanes.

The proportion of resin to the photoconductive compound can vary greatly, but elements having a high proportion of resin and a low proportion of photoconductive compound is the less desired. Mixtures of at least equal parts resin and photoconductive compound are preferred.

Methods of preparing dichroic photoconductive elements with the compounds of the general class are described in U.S. patent application Ser. No. 668,697, filed Sept. 18, 1967.

The substrate material, if one is desired, may be any which satisfy the requirements of electrophotography such as metal, glass, paper, or plastic. Unless it is to be used in a device employing dual corona discharge, such as U.S. Patent 2,922,883, the substrate should preferably have a conductivity greater than $10^{-10}$ ohm$^{-1}$ cm.$^{-1}$.

Application of the solutions of the compounds of the general class, with or without resins, is in the usual manner, such as by spraying, doctor blade, meniscus coating, etc., followed by drying.

While these compounds are highly colored and, hence, absorb in the visible light portion of the electromagnetic spectrum, e.g.—4000-6000 A., their spectral sensitivity to the visible portion may be improved by the addition of dyestuff sensitizers. In addition, activators which increase the photoconductivity of the compounds of the present invention may also be added in varying amounts up to and beyond equal molar. The only limitation on the amount of the activator is the dark conductivity. That is, high concentration of some activators increase the dark conductivity to an extent that the photoconductive element is not useful in electrophotography. To be useful in electrophotography, such activators must be used in lower concentration. Examples of dyestuff sensitizers and activators useful with the compounds of the present invention are found in U.S. Patent 3,232,755.

One type of electrophotographic process in which the compounds of the present invention are useful is known as xerography. This process comprises the laying down of the uniform electrostatic charge on a photoconductive insulating element, exposing the electrostatic charge surface to a pattern of light to effect a decay of charge in illuminated areas, and contacting the latent electrostatic image thus formed with colored electroscopic powder to render the image visible. Next, a copy sheet is brought into contact with the developed image and transferred thereto and fixed thereon. The residual toner remaining on the photoconductive insulating element is removed by cleaning and the element is then ready for the preparation of the next copy or the next cycle.

The general nature of the invention having been set forth, the following examples are now presented as to the specific preparation of intermediate compounds and compounds falling within the above general class and the specific preparation of these compounds into photoconductive elements which are then used in electrophotographic processes. The specific details presented are for purposes of illustration and not limitation.

Example I

A solution of 4 g. 2,6-diaminochlorobenzene and 6 g. ammonium thiocyanate in 50 ml. 80% acetic acid was cooled to 15° C. To this was slowly added, with stirring, 4.5 g. N,N'-dichlorourea in 50 ml. glacial acetic acid while keeping the temperature below 20° C. When the addition was complete, the mixture was stirred for 30 minutes and then filtered. The solid product was washed with water and with ethanol.

The crude material was digested for 1 hr. with 125 ml. 20% hydrochloric acid and then cooled to room temperature. The mixture was neutralized with ammonium hydroxide and filtered. The solid product was washed with water and dried. After recrystallization from ethanol, 4.8 g. white crystals, M.P. >350° C. were recovered, which were 2,6-diamino-4-chlorobenzo [1,2-d:5,4-d']bisthiazole having the following analysis:

Calculated: C, 37.4; H, 2.0; N, 21.8; S, 25.0; Cl, 13.8. Found: C, 37.7; H, 2.3; N, 19.0; S, 24.9; Cl, 14.0.

The compounds of 2,6-diamino-4-bromobenzo[1,2-d:5, 4-d']bisthiazole and 2,6-diamino-4-fluorobenzo[1,2-d:5, 4-d']bisthiazole are prepared in a similar manner except that the starting material is 2,6-diaminobromobenzene and 2,6-diaminofluorobenzene, respectively.

Example II

A mixture of 4.0 g. 2,6-diamino-4-chlorobenz[1,2-d:5, 4-d']bisthiazole and 5.8 g. p-N,N-dimethylaminobenzaldehyde in 150 ml. dimethylformamide was refluxed for 6 hours and then cooled. The resulting solid product was filtered off, washed with ethanol and recrystallized from dimethylformamide to give 2.6 g. deep organge crystals, M.P. 295-6° C., which were 2,6-bis-(p-N,N-dimethylaminobenzylideneamino) - 4 - chlorobenzo[1,2-d:5,4-d']bisthiazole (Formula 3) having the following analysis:

Calculated: C, 60.1; H, 4.5; N, 16.2; S, 12.3; Cl, 6.8. Found: C, 60.0; H, 4.5; N, 16.0; S, 12.1; Cl, 6.8.

Example III

A solution of 8 g. 2,6-diaminoanisole dihydrochloride, 10 g. sodium acetate, and 6.5 g. ammonium thiocyanate in 100 ml. 80% acetic acid was cooled to 15° C. To this was slowly added, with rapid stirring, 5.5 g. N,N'-dichlorourea in 70 ml. glacial acetic acid. When the addition was complete, the mixture was stirred for 30 minutes and filtered. The solid product was washed with water and recrystallized from ethanol to give 5.4 g. 2,6-diamino-3,5-dithiocyanatoanisole, M.P. 155.5–6.5° C.

This product was digested for 1 hr. with 200 ml. 20% hydrochloric acid, cooled, and neutralized with ammonium hydroxide. The solid product was filtered off, washed with water and dried. Recrystallization from ethanol-water yielded 4.7 g. white crystals, M.P. 305° C. (dec.), which were 2,6-diamino-4-methoxybenzo[1,2-d:5,4-d'] bisthiazole having the following analysis:

Calculated: C, 42.9; H, 3.2; N, 22.2; S, 25.4. Found: C, 42.7; H, 3.0; N, 22.4; S, 25.2.

The compounds of 2,6-diamino-4-ethoxybenzo[1,2-d:5,4-d']bisthiazole and 2,6-diamino - 4 - propoxybenzo[1,2-d:5,4-d']bisthiazole are prepared in a similar manner except that the starting material is 2,6-diaminophenetole dihydrochloride and 2-propoxy-1,3-phenylenediamine dihydrochloride, respectively.

Example IV

A mixture of 4 g. 2,6-diamino-4-methoxybenzo[2-d:5,4-d']bisthiazole and 6 g. p-N,N-dimethylaminobenzaldehyde in 200 ml. n-butanol was refluxed for 5 hours. The reaction mixture was cooled and filtered. The solid product was washed with ethanol and recrystallized from dimethylformamide to give red-orange crystals, M.P. 312–5° C., which were 2,6-bis(p-N,N-dimethylaminobenzylideneamino) - 4 - methoxybenzo[1,2-d:5,4-d']bisthiazole (Formula 4) having the following analysis:

Calculated: C, 63.0; H, 5.1; N, 16.3; S, 12.5. Found: C, 63.0; H, 5.0; N, 16.2; S, 12.5.

Example V

A solution of 13 g. 2,6-diaminotoluene and 16 g. ammonium thiocyanate in 150 ml. 80% acetic acid was cooled to 16° C. To this was slowly added, with stirring, 13 g. N,N'-dichlorourea in 130 ml. glacial acetic acid while keeping the temperature below 20° C. When the addition was complete, the mixture was stirred for 30 minutes and then filtered. The solid product was washed with water and with ethanol to give 15 g. material, M.P. 213–4° C.

The crude material was digested for 30 minutes with 250 ml. 20% HCl and then cooled to room temperature. The mixture was neutralized with ammonium hydroxide and filtered. The solid product was washed with water and recrystallized from ethanol-water (3:1) to give 8.0 g. 2,6-diamino-4-methylbenz[1,2-d:5,4-d']bisthiazole M.P. >330° C., having the following analysis:

Calculated: C, 45; H, 3.4; N, 23.7; S, 27.1. Found: C, 45.8; H, 3.3; N, 23.6; S, 27.3.

The compounds of 2,6-diamino-4-ethylbenzo[1,2-d:5,4-d']bisthiazole and 2,6-diamino-4-propylbenzoyl[1,2-d:5,4-d']bisthiazole are prepared in a similar manner except that the starting material is 2-ethyl-1,3-phenylenediamine and 2-propyl-1,3-phenylenediamine, respectively.

Example VI 4.6 g. 2,6-diamino-4-methylbenzo[1,2-d:5,4-d']bisthiazole was dissolved in 200 ml. n-butanol and 6.0 g. p-N,N-dimethylaminobenzaldehyde in 50 ml. n-butanol was added with stirring. The solution was refluxed for 2 hours and was then evaporated to about 100 ml. Then refluxing was continued for 2 hours and cooled. The resulting solid product was filtered off, washed with n-butanol, ethanol and ether, and recrystallized from dimethylformamide to give bright orange crystals, M.P. 263° C., which were 2,6-bis-(p-N,N-dimethylaminobenzylideneamino) - 4 - methylbenzo[1,2-d:5,4-d']bisthiazole (Formula 2) having the following analysis:

Theoretical: C, 65.0; H, 5.3; N, 16.8; S, 12.9. Experimental: C, 64.3; H, 4.8; N, 17.1; S, 13.2.

Example VII 2,6-diaminobenz[1,2-d:5,4-d']bisthiazole (4.4 g.) was dissolved in boiling n-butanol (250 ml.) and 6.0 g. p-N,N-dimethylaminobenzaldehyde in 100 ml. n-butanol was added with stirring. The solution was refluxed for 3 hours and the resulting precipitate was filtered off and washed with ethyl alcohol. The reddish-brown solid was recrystallized from boiling dimethylformamide to give 3.5 g. bright orange crystals, M.P. 317–9° C., which were 2,6-bis(p-N,N - dimethylaminobenzylideneamino) - benzo[1,2 - d: 5,4-d']bisthiazole (Formula 1) having the following analysis:

Calculated: S, 64.4; H, 5.0; N, 17.3; S, 13.2. Found: C, 64.3; H, 5.0; N, 17.4; S, 13.2.

The compound of 2,6-bis(p-N,N-diethylaminobenzylideneamino)-benzo[1,2-d': 5,4-d']bisthiazole was prepared according to G. Barnikow, H. Kunzek, and M. Hofmann, J. Prakt Chem., [4], 27, 271 (1965) having the following analysis:

Theoretical: C, 66.6; H, 5.9; N, 15.5; S, 11.8. Found: C, 66.5; H, 5.6; N, 15.7; S, 12.1.

Example VIII (comparison)

For purposes of comparing the photoconductivity of the novel compound of 2,6-bis(p-N,N-dimethylaminobenzylideneamino)-benzo[1,2 - d':5,4 - d']bisthiazole and 2,6-bis(p - N,N - diethylaminobenzylideneamino) - benzo [1,2-d':5,4-d']bisthiazole, a known compound, but not a known photoconductor, two photoconductive elements were prepared and tested, one containing the novel dimethyl-compound and the other containing the diethyl-compound. Both elements were prepared by mixing the respective compounds in polystyrene (1:1 by weight concentration) followed by coating the mixture on an aluminum slide. For testing, samples of each element were placed in a laboratory electrometer which measures the decay time of an electrostatic charge on the surface of the sample when exposed to light. The decay time is expressed in terms of $T^{1/2}$, i.e.—the time it takes for the potential resulting from the electrostatic charge to reach one-half of its initial value. The results from this comparative test showed that the $T^{1/2}$ for novel dimethyl-compound was 1.2 seconds whereas the diethyl-compound had a $T^{1/2}$ of 12.2 seconds (commercially used selenium has a $T^{1/2}$ of 0.72.) Therefore, the novel dimethyl compound is slightly more than an order of magnitude faster than the known diethyl-compound and approaches in exposure speed commercially used selenium.

Example IX

A photoconductive element was prepared by dispersing 2,6-bis(p - N,N - dimethylaminobenzyldeneamino) - benzo [1,2-d:5,4-d']bisthiazole (Formula 1) in an equal weight of polystyrene dissolved in 1,2-dichloroethane and coating the solution on an aluminum slide with a doctor blade set at a 7 mil wet gap. The thus prepared photoconductive element was uniformly electrostatically charged using a Xerox Model D Processor at a potential of +7000 volts. After charging, the element was exposed to a 40 watt incandescent lamp at a distance of 30 inches for 0.1 second and using positive transparency as a document to be copied. The formed electrostatic image was developed with negatively charged toner (Xerox 914) across the photo-conductive element. Again using the Xerox Model D Processor, the toner image was transferred to paper by spraying positive charges on the back of the paper. After transfer of the toner image, the toner was fused to the paper on a hot plate to yield a high quality copy of the document with high contrast, high image density, and no background.

Example X 2,6-diaminobenz[1,2-d:5,4-d']bisthiazole (2.8 g.) was dissolved in boiling n-butanol (150 ml.) and 4.0 g. p-chlorobenzaldehyde in 50 ml. n-butanol was added with stirring. The solution was refluxed for 3 hours and was then evaporated to about 100 ml. The precipitate was filtered off, washed with ethanol, and then recrystallized from dimethylformamide to give 2.1 g. golden yellow crystals, M.P. 331–2° C., which were 2,6-bis(p-chlorobenzylideneamino)-benzo[1,2-d:5,4-d']bisthiazole (Formula 7) having the following analysis:

Calculated: C, 56.5; H, 2.6; N, 12.0; S, 13.7; Cl, 15.2. Found: C, 56.3; H, 2.8; N, 11.9; S, 13.5; Cl, 15.3.

Eample XI 7.0 g. 2-amino-6-(p-nitrobenzylideneamino)-benzo [1,2-d:5,4-d']bisthiazole and 4.0 g. p-nitrobenzaldehyde in 100 ml. nitrobenzene was refluxed for 3½ hours. After cooling and an addition of 1 g. p-nitrobenzaldehyde the reaction mixture was refluxed again for 2 hours. The mixture was cooled and the resulting precipitate was filtered off and washed with ethanol. Recrystallization from nitrobenzene gave dark brown crystals, M.P. 316° C., which were 2,6-bis(p-nitrobenzylideneamino)-benzo[1,2-d:5,4-d']bisthiazole (Formula 5) having the following analysis:

Calculated: C, 54.1; H, 2.5; N, 17.2; S, 13.1. Found: C, 54.0; H, 2.7; N, 17.4; S, 13.1.

Example XII 7.0 g. 2 - amino - 6-(p-nitrobenzylideneamino)-benzo [1,2-d:5,4-d']bisthiazole was dissolved in 200 ml. boiling dimethylformamide and 5.0 g. p-N,N-dimethylaminobenzaldehyde in 50 ml. dimethylformamide was added with stirring. The solution was refluxed for 7 hours and was then cooled to room temperature. The precipitate was filtered off, washed with ethanol, and then recrystallized from dimethyl formamide to give red-purple crystals, M.P. >300° C., which were 2-(p-N,N-dimethylaminobenzylideneamino) - 6 - (p-nitrobenzylideneamino[1,2-d:5,4-d']bisthiazole (Formula 6) having the following analysis:

Calculated: C, 59.2; H, 3.7; N, 17.3; S, 13.2. Found: C, 59.4; H, 3.8; N, 17.1; S, 13.0.

Example XIII

A mixture of 11 g. 2,6-diaminobenzo[1,2-d:5,4-d'] bisthiazole and 8 g. p-nitrobenzaldehyde in 1 liter n-butanol was refluxed for 4 hours and then cooled. The resulting solid product was filtered off, washed with n-butanol and recrystallized from dimethylformamide to give brown crystals, M.P. >300° C., which were 2-amino-6-(p-nitrobenzylideneamino)-benzo[1,2 - d:5,4-d]bisthiazole (Formula 9) having the following analysis:

Calculated: C, 50.7; H, 2.5; N, 19.7; S, 18.0. Found: C, 50.6; H, 2.5; N, 19.5; S, 17.8.

Example XIV

A mixture of 4.4 g. 2,6 - diaminobenzo[1,2-d:5,4-d'] bisthiazole and 8.5 g. 9-formyljulolidine in 120 ml. n-butanol was refluxed for 4 hours and then cooled. The resulting product was filtered off, washed with ethanol and recrystallized from dimethylformamide to give red-purple crystals, M.P. >300° C., which were 2,6-bis (9-julolidinylideneamino)-benzo [1,2-d:5,4-d'] bisthiazole (Formula 15) having the following analysis:

Calculated: C, 69.4; H, 5.5; N, 14.3; S, 10.9. Found: C, 69.4; H, 5.6; N, 14.4; S, 10.8.

A photoconductive element was prepared by dispersing 2,6 - bis(9 - julolidinylideneamino)-benzo[1,2-d:5,4-d'] bisthiazole (Formula 15) in an equal weight of polystyrene dissolved in 1,2-dichloroethane, and coating the solution on an aluminum slide with a doctor blade set at a 5 mil wet gap. The thus prepared photoconductive element was uniformly electrostatically charged using a Xerox Model D Processor at a potential of +7000 volts. After charging, the element was exposed to a 375 watt GE Photo EBR at a distance of 12 inches for 0.1 second, and using a positive transparency as a document to be copied. The formed electrostatic image was developed with negatively charge toner (Xerox 914) by cascading the toner and a carrier (Xerox 914) across the photoconductive element. Again using the Xerox Model D Processor, the toner image was transferred to paper by spraying positive charges on the back of the paper. After transfer of the toner image, the toner was fused to the paper on a hot plate to yield a high quality copy of the document with high contrast, high density, and only a faint background.

Example XV

A mixture of 11 g. 2,6-diaminobenzo[1,2-d:5,4-d'] bisthiazole and 16 g. p-anisaldehyde in 250 ml. n-butanol was refluxed for 3 hours and then cooled. The resulting solid product was filtered off, washed with ethanol and ether, and recrystallized from dimethylformamide to give dark yellow crystals, M.P. 224–6° C., which were 2,6-bis(p-anisylideneamino)-benzo[1, 2 - d:5,4-d]bisthiazole (Formula 18) having the following analysis:

Calculated: C, 62.9; H, 3.9; N, 12.2; S, 14.0. Found: C, 62.9; H, 3.9; N, 12.2; S, 13.9.

Example XVI

A mixture of 3.0 g. 2,6-diaminobenzo[1,2-d:5,4-d'] bisthiazole and 4.0 g. 4-fluorobenzaldehyde in 100 ml. n-butanol was refluxed for 3 hours. Then approximately 50 ml. n-butanol was distilled off, and the reaction mixture was cooled and filtered. The dark yellow solid was recrystallized from dimethylformamide to give light yellow crystals, M.P. 321° C., which were 2,6-bis (p-fluorobenzylideneamino)-benzo[1,2-d:5,4-d] bisthiazole (Formula 8) having the following analysis:

Calculated: C, 60.8; H, 2.8; N, 12.9; S, 14.7. Found: C, 60.8; H, 2.8; N, 13.0; S, 14.6.

Example XVII

A mixture of 3.4 g. 2,6-diaminobenz[1,2-d:5,4-d'] bisthiazole and 5.5 g. p-N,N-dimethylaminocinnamaldehyde in 250 ml. n-butanol was refluxed for 3 hours. Approximately 150 ml. n-butanol was distilled off, and refluxing was continued for an additional hour. The mixture was cooled and the resulting precipitate was filtered off and washed with ethanol. Recrystallization from n-butanol yielded 1.8 g. red-purple crystals, M.P. 300–2° C., which were 2,6 - (p-N,N-dimethylaminocinnamylideneamino)-benzo[1,2-d:5,4-d']bisthiazole (Formula 10) having the following analysis:

Calculated: C, 67.1; H, 5.3; N, 15.7; S, 12.0. Found: C, 67.1; H, 5.2; N, 15.7; S, 12.0.

Following the procedure of Example XIV, a photoconductive element containing 2,6 - bis(p-N,N-dimethylaminocinnamylideneamino)-benzo[1,2 - d:5,4' - d']bisthiazole (Formula 10) was prepared and tested. The only difference in procedure during testing was that the exposure was for 6 seconds and the quality of the copy was essentially the same except the image density was slightly less.

Example XVIII

A solution of 22 g. 2,6-diaminopyridine and 33 g. ammonium thiocyanate in 200 ml. 80% acetic acid was cooled to 10° C. To this was added in small portions a solution of 27 g. N,N'-dichlorourea in 250 ml. glacial acetic acid while keeping the temperature below 20° C. When the addition was complete, the mixture was stirred for 30 minutes and then filtered. The solid product was recrystallized from 70% dioxane, leaving behind a black tar. The product which crystallized out was filtered off and washed with 50% dioxane, M.P. 207° C.

10 g. of the crude material were suspended in 300 ml. amylalcohol and refluxed for 6 hours. The solid product was filtered off, washed with amylalcohol and ethanol, M.P.>300° C., which was 2,6-diaminopyrido [2,3-d:6,5-d']bisthiazole having the following analysis:

Calculated: C, 37.6; H, 2.3; N, 31.4; S, 28.6. Found: C, 37.8; H, 2.5; N, 31.4; S, 28.6.

Example XIX 22 g. 2,6-diaminopyrido[2,3-d:6,5-d']bisthiazole was dissolved in boiling diethyleneglycol (200 ml.) and 4 g. p-N,N-dimethylaminobenzaldehyde was added with stirring. The solution was refluxed for 1 hour and then the solid was precipitated out by pouring the solution into 200 ml. water. The precipitate was filtered off and recrystallized from dimethylformamide to give dark red crystals, M.P. 300° C., which was 2,6-bis (p-N,N-dimethylaminobenzylideneamino) - pyrido[2,3 - d:6,5-d']bisthiazole (Formula 22) having the following analysis:

Calculated: C, 61.8; H, 4.8; N, 20.2; S, 13.2. Found: C, 61.0; H, 5.6; N, 19.9; S, 13.0.

Example XX

A mixture of 3.3 g. of 2,6-diaminobenzo[1,2-d:5,4-d'] bisthiazole and 5.7 g. of p-morpholinobenzaldehyde was heated in a crucible at 200° C. for 20 minutes. The mixture melted at first and, after a few minutes, partially solidified. When the heating was completed, the orange-yellow mass was broken up and digested with hot ethanol and filtered. The solid product was dissolved in about 800 ml. of boiling dimethylformamide and filtered. The filtrate was cooled to room temperature and allowed to stand overnight.

The crystalline product was filtered off, washed with dimethylformamide and alcohol, and dried, M.P. 295° C. (darker at 270° C., softer at 280° C.). This product was recrystallized again from dimethylformamide, filtered, washed with dimethylformamide and then with alcohol, and vacuum dried overnight to yield 2,6-bis(p-morpholinobenzylideneamino)-benzo[1,2 - d:5,4 - d']bisthiazole (Formula 14), M.P. 318–319° C. (darker and softer at 315° C.) having the following analysis:

Calculated: C, 63.4; H, 5.0; N, 14.8; S, 11.3. Found: C, 62.5; H, 4.7; N, 14.8; S, 11.2.

The compounds of 2,6-bis(p-thiomorpholinobenzylideneamino)-benzo[1,2 - d:5,4 - d']bisthiazole (Formula 16) and 2,6-bis(p-piperidinobenzylideneamino)-benzo [1,2-d:5,4-d']bisthiazole (Formula 17) are prepared in a similar manner except that the starting material is p-thiomorpholinobenzaldehyde and p-piperidinobenzaldehyde, respectively.

Example XXI 1.4 g. of 2,6-dimethylbenzo[1,2-d:5,4-d']bisthiazole and 1.75 g. of p-dimethylaminobenzaldehyde were dissolved in 50 ml. of diethyleneglycol and a catalytic amount of stannous chloride added. The reaction was heated to reflux for 1 hour, cooled and filtered. The orange precipitate was washed with water, ethanol, and acetone. The 2,6-bis(p - N - dimethylaminostyryl)benzo[1,2-d:5,4-d'] bisthiazole (Formula 12) product weighed 1.1 g., did not melt at 350° C. and had the following analysis:

Calculated: C, 69.8; H, 5.4; S, 11.6. Found: C, 68.74; H, 5.10; S, 11.53.

Example XXII 2 g. of 2,6-diaminobenzo[1,2-d:5,4-d']bisthiazole was slurried in 40 ml. of acetic acid, 6 ml. of sulfuric acid and 30 ml. of water. The mixture was cooled to 0° C. and was added slowly to a solution of nitrososulfuric acid (prepared from 1.04 g. of sodium nitrite in 18 g. of sulfuric acid) at 0° C. To this was added a mixture of 3 g. of dimethylaniline in 160 ml. of water 50 g. of crystalline sodium acetate and 10 ml. of acetic acid. The reaction was then stirred for about ½ hour and was filtered. The precipitate of dark blue crystalline, which was water washed, and dried overnight, was 2,6-bis(p-N,N-dimethylaminophenyl azo)-benzo[1,2-d:5,4-d']bisthiazole (Formula 13).

Example XXIII 1.5 g. 2,6-diaminobenzo[1,2-d:5,4-d']bisthiazole and 3.0 g. 5-p-N,N-dimethylaminophenylpenta-2:4-dienal in 120 ml. n-butylalcohol was refluxed for 3 hours. Approximately 60 ml. n-butanol was distilled off, and refluxing was continued for an additional hour. The mixture was cooled and the resulting precipitate was filtered off and washed with ethanol. Recrystallization from dimethylformamide yielded 2.0 g. dark blue crystals, M.P.>360° C., which was 2,6-bis(5'-(p-N,N-dimethylaminophenyl)-2',4 ' pentadienylideneamino) - benzo[1,2-d:5,4-d']bisthiazole (Formula 11) having the following analysis:

Calculated: C, 69.4; H, 5.5; N, 14.3; S, 10.9. Found: C, 69.2; H, 5.4; N, 14.3; S, 10.8.

Following the procedure of Example XIV, a photoconductive element containing 2,6-bis(5'-(p-N,N-dimethylaminophenyl) - 2',4' - pentadienylideneamino) - benzo [1,2-d:5,4-d']bisthiazole (Formula 11) was prepared and tested. The only difference in procedure was that the exposure was for 0.5 second and the quality of copy was better than the copy of Example XIV in that the image density was greater and the background was less.

After cleaning the photoconductive element with cotton to remove any residual toner, the element was uniformly exposed and dark adapted to remove any persistent conductive image from the previous exposure.

A second copy was prepared of the same document and, except for reversing the charging and exposing steps and lengthening the exposure to 5 seconds, the procedure was the same as Example XIV. That is, this copy was prepared by first exposing the photoconductive element to the image of the document, followed by uniformly electrostatically charging the element to form the electrostatic image. The copy was good quality with high image density, high contrast and only a faint background, and shows that the compounds of the present invention can be used in the so-called persistent mode electrophotographic processes.

Example XXIV

A solution of 14 g. 4-chloro-m-phenylenediamine and 16 g. ammonium thiocyanate in 150 ml. 80% acetic acid was cooled to 0° C. To this was slowly added, with stirring, 13.5 g. dichlorourea in 150 ml. glacial acetic acid while keeping the temperature below 20° C. When the addition was completed, stirring of the mixture was continued for 20 minutes and then filtered. The grey solid was recrystallized from ethanol, M.P. 187–8° C.

The product was digested for 30 minutes with 150 ml. 20% hydrochloric acid, cooled, and neutralized with concentrated ammonium hydroxide. The solid product was filtered off, washed with water and dried. Recrystallization from ethanol-water gave white crystals, M.P. >350° C., which were 2,7-diamino-4-chlorobenzo[1,2-d:3,4-d'] bisthiazole having the following analysis:

Calculated: C, 37.4; H, 2.0; N,21.8; S, 25.0; Cl, 13.8. Found: C, 37.4; H, 2.0; N, 21.7; S, 25.2; Cl, 13.9.

Example XXV 1.6 g. 2,7 diamino-4-chlorobenzo[1,2-d:3,4-d']bisthiazole and 2.6 g. p-N,N-dimethylaminobenzaldehyde was refluxed in 100 ml. dimethylformamide for 3 hours and was then evaporated to about 30 ml. The precipitate was filtered off, washed with dimethylformamide and ethanol, and then recrystallized from dimethylformamide to give deep orange crystals, M.P. 274–6° C., which were 2,7-bis (p - N,N - dimethylaminobenzylideneamino) - 4 - chlorobenzo[1,2-d:3,4-d']bisthiazole (Formula 19) having the following analysis:

Calculated: C, 60.1; H, 4.5; N, 16.2; S, 12.3; Cl, 6.8. Found: C, 60.0; H, 4.5; N, 16.3; S, 12.3; Cl, 6.7.

Example XXVI

A solution of 16 g. 2,4 diaminoanisole dihydrochloride, 20 g. sodium acetate and 13 g. ammonium thiocyanate in 200 ml. 80% acetic acid was cooled to 10° C. To this was slowly added, with stirring, 11 g. N,N'-dichlorourea in 150 ml. glacial acetic acid while keeping the temperature below 20° C. When the addition was complete, the mixture was stirred for 20 minutes and then 50 ml. water was added and filtered. The solid product was washed with 50% acetic acid to give 6 g. material, M.P. 162–4° C.

This product was digested for 20 minutes with 250 ml.

20% hydrochloric acid, cooled, and neutralized with ammonium hydroxide. The solid product was filtered off, washed with water and dried. Recrystallization from ethanol-water (1:1) yielded 2.5 g. white crystals, M.P. 312–4° C., which were 2,7-diamino-4-methoxy-benzo[1,2-d:3,4-d']bisthiazole having the following analysis:

Calculated: C, 42.9; H, 3.2; N, 22.2; S, 25.4. Found: C, 42.9; H, 3.2; N, 22.3; S, 25.5.

Example XXVII

A solution of 13 g. 2,4-diaminotoluene and 16 g. ammonium thiocyanate in 150 ml. 80% acetic acid was cooled to 16° C. To this was slowly added, with stirring, a solution of 13 g. N,N'-dichlorourea in 130 ml. glacial acetic acid while keeping the temperature below 28° C. When the addition was completed, stirring of the mixture was continued for 30 minutes, filtered and washed with 50 ml. 50% acetic acid, water and 100 ml. 5% ammonium hydroxide. Recrystallization from ethanol-water yielded 14 g. white crystals, M.P. 185–6° C.

This product was digested for 30 minutes with 250 ml. hydrochloric acid, cooled and neutralized with ammonium hydroxide. The solid product was filtered off, washed with water and dried. Recrystallization from ethanol-water yielded 6.5 g. white crystals, M.P. 309° S., which were 2,7-diamino-4-methylbenzo[1,2-d:3,4-d']bisthiazole having the following analysis:

Calculated: C, 45.8; H, 3.4; N, 23.7; S, 27.1. Found: C, 45.8; H, 3.3; N, 23.6; S, 27.0.

Example XXVIII

A solution of 24 g. 2,7 diamino-4-methylbenzo[1,2-d:3,4-d']bisthiazole in 100 ml. n-butanol was heated to reflux and 4.0 g. p-N,N-dimethylaminobenzaldehyde in 50 ml. n-butanol was added. The mixture was refluxed for 3 hours and was then evaporated to 75 ml. The mixture was refluxed for an additional 1½ hours and then cooled. The precipitate was filtered off, washed with ethanol and ether, and recrystallized from dimethylformamide to give 3.3 g. light orange crystals, M.P. 245° C., which were 2,7-bis(p - N,N - dimethylaminobenzylideneamino)4-methylbenzo[1,2-d:3,4-d']bisthiazole (Formula 20) having the following analysis:

Calculated: C, 65.0; H, 5.3; N, 16.8; S, 12.9. Found: C, 64.9; H, 5.3; N, 16.8; S, 12.9.

The compound of 2,7-bis(p-N,N-dimethylaminobenzylideneamino)4 - methoxybenzo[1,2-d:3,4-d']bisthiazole (Formula 21) is prepared in a similar manner except that 2,7 - diamino - 4 - methoxybenzo[1,2-d:3,4-d']bisthiazole is the starting material.

While the invention has been shown and described with reference to preferred embodiments thereof, it will be appreciated by those skilled in the art that variations in form may be made therein without departing from the spirit and scope of the invention. For example, it will be understood that the compounds are not limited as photoconductors in the mode of electrophotography known as xerography, but may be used in persistent electrophotographic methods such as that described in U.S. Patent 2,845,348 or any other method where the photoconductor is exposed before charging. In addition, even though the greatest demand for the present invention is in conjunction with electrophotography, the compounds are also particularly well suited for other photoconductive applications.

What is claimed is:

1. An electrophotographic process comprising forming an electrostatic charge pattern on a photoconductive element and subsequently developing a visible image therefrom, said photoconductive element comprising a compound having a structural formula selected from the group consisting of:

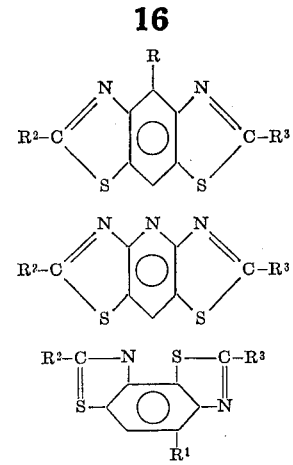

wherein R is selected from the group consisting of hydrogen, lower alkyl, lower alkoxy, and halogen, wherein $R^1$ is selected from the group consisting of lower alkyl, lower alkoxy, and halogen, and wherein $R^2$ and $R^3$ may be the same or different and are selected from the group consisting of:

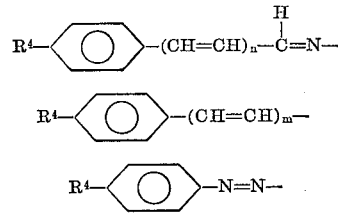

wherein $R^4$ is selected from the group consisting of hydrogen, lower dialkylamino, nitro, lower alkoxy, morpholino, thiomorpholino, piperidino, halogen, and julolidinyl, wherein $n$ is an integer from 0 to 3, inclusive, and wherein $m$ is an integer from 1 to 4 inclusive.

2. The process of claim 1 wherein the structural formula is:

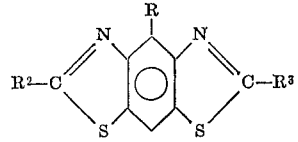

wherein R is selected from the group consisting of hydrogen, lower alkyl, lower alkoxy, and halogen, wherein $R^1$ is selected from the group consisting of lower alkyl, lower alkoxy, and halogen, and wherein $R^2$ and $R^3$ may be the same or different and have the following structural formula:

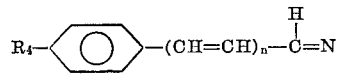

wherein $R^4$ is selected from the group consisting of hydrogen, lower dialkylamino, nitro, lower alkoxy, morpholino, thiomorpholino, piperidino, halogen, and julolidinyl, wherein $n$ is an integer from 0 to 3, inclusive, and wherein $m$ is an integer from 1 to 4, inclusive.

3. The process of claim 1 wherein the compound is 2,6-bis - (p - N,N - dimethylaminobenzylideneamino) - 4 - chlorobenzo[1,2-d:5,4-d']bisthiazole.

4. The process of claim 1 wherein the compound is 2,6-bis(p - N,N - dimethylaminobenzylideneamino) - 4-methylbenzo[1,2-d:5,4-d']bisthiazole.

5. The process of claim 1 wherein the compound is 2,6 - bis(p - N,N - dimethylaminobenzylideneamino)-benzo[1,2-d:5,4-d']bisthiazole.

6. The process of claim 1 wherein the compound is 2,6 - bis(p - chlorobenzylideneamino) - benzo[1,2 - d:5, 4-d']bisthiazole.

7. The process of claim 1 wherein the compound is 2,6-bis(p-nitrobenzylideneamino) - benzo[1,2 - d:5,4-d'] bisthiazole.

8. The process of claim 1 wherein the compound is 2 - (p - N,N - dimethylaminobenzylideneamino) - 6 - (p-nitrobenzylideneamino)[1,2-d:5,4-d']bisthiazole.

9. The process of claim 1 wherein the compound is 2,6 - bis(9 - julolidinylideneamino) - benzo[1,2 - d:5,4-d'] bisthiazole.

10. The process of claim 1 wherein the compound is 2,6 - bis(p - fluorobenzylideneamino) - benzo[1,2-d:5,4-d']bisthiazole.

11. The process of claim 1 wherein the compound is 2,6 - bis(p - N,N - dimethylaminocinnamylideneamino)-benzo[1,2-d:5,4-d']bisthiazole.

12. The process of claim 1 wherein the compound is 2,6 - bis(p - N - dimethylaminostyryl)benzo[1,2 - d:5,4-d']bisthiazole.

13. The process of claim 1 wherein the compound is 2,6 - bis(5' - (p - N,N - dimethylaminophenyl) - 2',4'-pentadienylideneamino) - benzo[1,2 - d:5,4 - d']bisthiazole.

References Cited

UNITED STATES PATENTS

| | | | |
|---|---|---|---|
| 3,148,982 | 9/1964 | Ghys et al. | 96—1 |
| 3,158,475 | 11/1964 | Cassiers et al. | 96—1 |
| 3,238,041 | 3/1966 | Corrsin | 96—1 |
| 3,257,204 | 6/1966 | Siis et al. | 96—1.5 |
| 3,279,918 | 10/1966 | Cassiers et al. | 96—1 |

GEORGE F. LESMES, Primary Examiner

J. C. COOPER III, Assistant Examiner

U.S. Cl. X.R.

96—1.5; 260—305, 240, 146